(12) United States Patent
Showan

(10) Patent No.: US 6,305,446 B1
(45) Date of Patent: Oct. 23, 2001

(54) CUTTING MACHINE

(76) Inventor: Nicholas Timothy Showan, The Thatched House, Gravel Castle, Barham, Canterbury, Kent CT4 6EU (GB)

( * ) Notice: Subject to any disclaimer, the term of this patent is extended or adjusted under 35 U.S.C. 154(b) by 0 days.

(21) Appl. No.: 09/485,959

(22) PCT Filed: Aug. 18, 1998

(86) PCT No.: PCT/GB98/02472

§ 371 Date: May 18, 2000

§ 102(e) Date: May 18, 2000

(87) PCT Pub. No.: WO99/08834

PCT Pub. Date: Feb. 25, 1999

(30) Foreign Application Priority Data

Aug. 19, 1997 (GB) .................................................. 9717553

(51) Int. Cl.[7] .............................. B27C 5/00; B23Q 39/02
(52) U.S. Cl. .................... 144/135.2; 144/2.1; 144/92; 144/245.1; 144/243; 144/250.12; 144/365; 408/70; 408/138; 198/783
(58) Field of Search .................................. 29/33 Q, 564, 29/564.7; 198/783; 408/70, 138; 144/2.1, 3.1, 35.1, 92, 93.1, 242.1, 245.1, 245.2, 243, 250.18, 365, 134.1, 136.1; 226/58

(56) References Cited

U.S. PATENT DOCUMENTS

| 1,995,505 | 3/1935 | Goss et al. . |
| 3,918,145 | 11/1975 | Oglivie et al. . |
| 4,417,680 | 11/1983 | Culley, Jr. . |
| 4,640,056 | * 2/1987 | Stump .............................. 144/250.12 |
| 5,144,737 | 9/1992 | Riesmeier . |
| 5,287,782 | 2/1994 | Scott . |
| 5,477,899 | * 12/1995 | Schmidt .......................... 144/250.12 |

FOREIGN PATENT DOCUMENTS

| 1115976 | 6/1968 | (GB) . |
| 1307819 | 2/1973 | (GB) . |
| 1413106 | 11/1975 | (GB) . |
| 2010174A | 6/1979 | (GB) . |
| WO88/04589 | 6/1988 | (WO) . |

* cited by examiner

Primary Examiner—W. Donald Bray
(74) Attorney, Agent, or Firm—J. Charles Dougherty

(57) ABSTRACT

A cutting machine comprises first (10) and second (12) work piece support means, said means including opposed surfaces operable to grip a work piece and move it in a controlled manner in a first dimension, and first (14) and second (16) cutting tools disposed substantially between the first and second work piece supported means such that they are operable to approach and cut the work piece from opposite sides, wherein each cutting tool is movable in second and third dimensions that are substantially orthogonal to the first dimension and to each other.

10 Claims, 1 Drawing Sheet

CUTTING MACHINE

Figure 1:
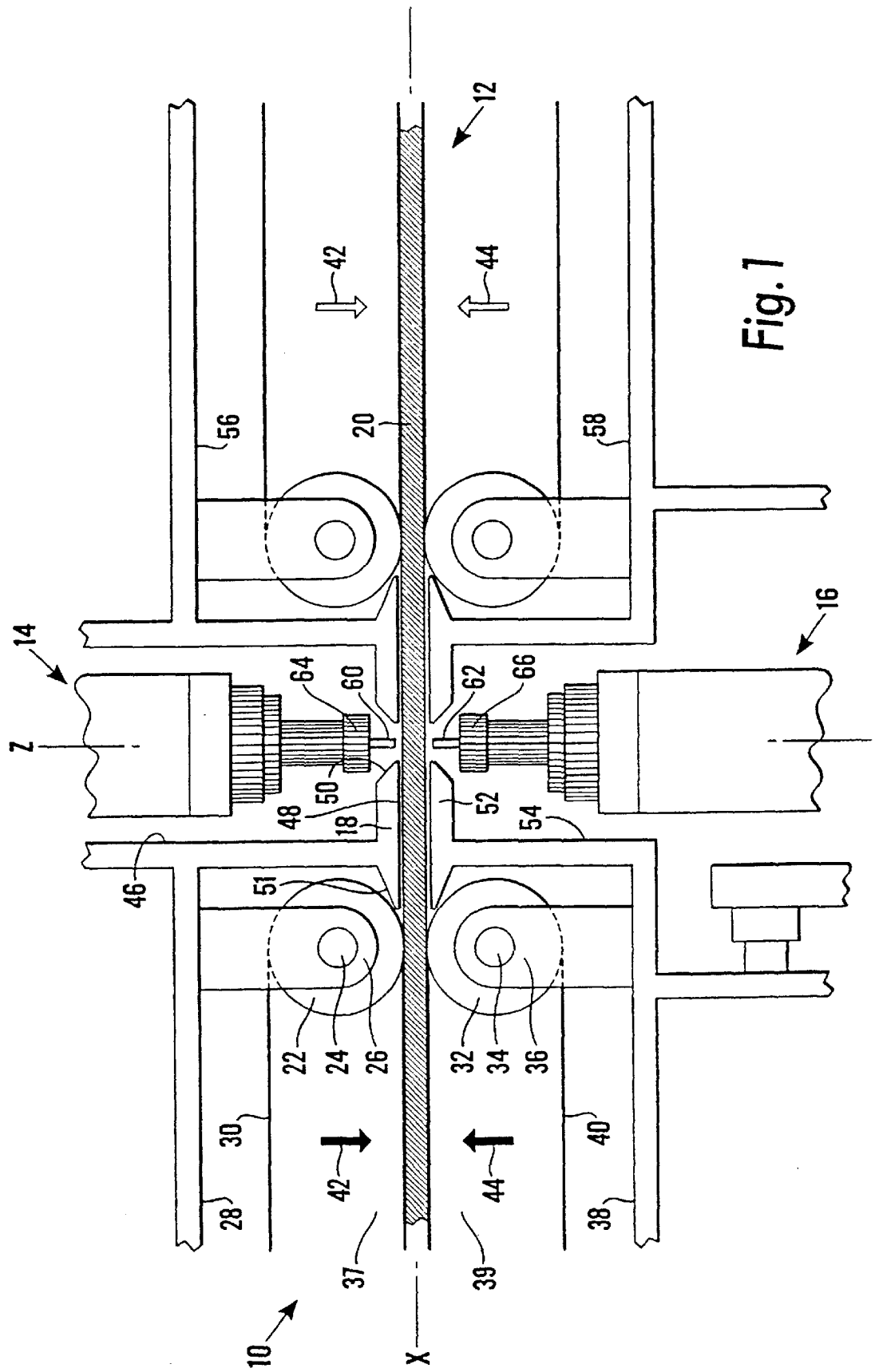

This invention relates to cutting machines, and more specifically, to a machine for processing sheets or boards of material.

Cutting machines for processing sheets or boards are used, for example, in furniture production and architectural industries. Current machines frequently require separate jigs or fixtures for supporting the piece of work and/or guiding the tools operating upon it. Machining of the work is inefficient, invariably being conducted from only one side of the work piece. Production of single items frequently requires several manufacturing steps during which the work may be transferred between a number of conventional machines. Examples of typical machines required include borers, rotary shapers, panel saws, tenoners, moulders and the like.

GB 1413106 discloses apparatus for working on an elongate work piece comprising driven rollers, an opposed set of idling pressure rollers, and cutting tools disposed on either side of the work piece substantially between the rollers.

GB 1307819 discloses a cutting machine comprising first and second work piece support means including opposed surfaces operable to grip a work piece and move it in a controlled manner in a first dimension, and first and second cutting tools disposed substantially between the first and second work piece support means such that they are operable to approach and cut the work piece from opposite sides, whereby each cutting tool is movable in a second and third dimensions that are substantially orthogonal to the first dimension and to each other.

This invention seeks to provide an improved cutting machine.

According to a first aspect of the present invention there is provided a cutting machine comprising first and second work piece support means, said means including opposed surfaces operable to grip a work piece and move it in a controlled manner in a first dimension, and first and second cutting tools disposed substantially between the first and second work piece support means such that they are operable to approach and cut the work piece from opposite sides, each cutting tool being movable in second and third dimensions that are substantially orthogonal to the first dimension and to each other, characterised in that the machine further comprises one or more elongate scraper bars oriented with their main axis substantially perpendicular to the first dimension and disposed so as to abut surfaces of the work piece adjacent to the area being cut.

Preferably, belts on resiliently-biased conveyor rollers provide the opposed surfaces that grip the work piece. The resilience may be provided by an electric motor drive arrangement for the rollers. The position of the work piece relative to the belt is maintained by frictional forces between belt and work piece surfaces.

According to a second aspect of the present invention there is provided a cutting machine comprising gripping work piece support means operable to reversibly feed a work in a feed direction, and a plurality of elongate scraper bars oriented with their main axis substantially perpendicular to the feed direction and disposed so as to abut surfaces of the work piece adjacent to the area being machined.

Preferably the elongate bars are resiliently sprung so that they are biased towards the plane containing the work piece. The bars grip and support the work piece close to the area to be cut, continually clean the belts by virtue of a scraping action, and confine debris from the cutting operation to a specific area.

A preferred cutting machine provides for automatic loading and unloading of the work piece and allows simultaneous machining of more than one surface in a continuous process. The work piece is floated in and out of position by the respective work piece support means which are also used to accurately control the position of the work piece through the process. The elongate bars provide additional support and rigidity in the vicinity of machining operations. They prevent debris created by machining from working between the opposed gripping surfaces and the work piece.

An embodiment of the present invention is described, by way of example only, with reference to the accompanying drawing.

FIG. 1 is a side view of a preferred cutting machine.

With reference to FIG. 1, a preferred cutting machine with a welded steel construction comprises first 10 and second 12 belt grip assemblies, first 14 and second 16 spindles and a plurality of scraper bars e.g. 18.

The work piece (20) is shown extending between the first 10 and second 12 belt grip assemblies in a plane containing the x-axis. The area to be machined is positioned between the spindles 14, 16 and the plurality of scraper bars 18. Each belt grip assembly 10, 12 includes a first cylindrical roller 22 supported on a spindle 24 received by first 26 and second bearing housings. Although not shown, the second bearing housing is adjacent the first bearing housing and supported by the same surface 28. An elastomeric belt 30 which surrounds the first roller 22 extends towards a second cylindrical roller disposed at a predetermined distance along the x-axis to form an endless conveyor belt arrangement 37. A third cylindrical roller 32, positioned opposite the first roller 22, is supported on another spindle 34 received by similar bearing housings (e.g. 36). These bearing housings are supported by a different surface 38. The spacing between rollers 22 and 32 can be adjusted to cater for differences in the size of the work piece. A second elastomeric belt 40, which surrounds the third roller 32, extends towards a fourth cylindrical roller disposed at a predetermined distance along the x-axis to form a second endless conveyor belt arrangement 39.

The first 37 and second 39 conveyor belts form two halves of the belt grip assembly 10. They are resiliently biased in the directions indicated by arrows 42 and 44 respectively. The reverse side of each belt is attached directly to a slideway which is, in turn, driven by a ball screw and servo. This arrangement prevents movement along the roller axes, but allows accurate motion of the work piece along the x-axis under the control of the ball screw. In this way, situations in which inadequate support risks distortion of the work piece are minimised.

The second belt grip assembly 12 is similar to the first 10. It is supported in a position that is symmetrically opposite with equivalent components provided at corresponding elevations. Where possible, the conveyor rollers are controlled by common motors or equivalent motors following the same control signals. The distance between the first 10 and second 12 assemblies along the x-axis is variable.

Scraper bar 18 is formed by an elongate element disposed on a support member 46 protruding from surface 28. The longest dimension of the scraper bar 18 runs in the direction of the y-axis (into the plane of the page). The bar 18 spans at least the breadth of the work piece. Surface 48 abuts a first major surface of the work piece along the length of the scraper bar 18. The edges of the bar 18 are bevelled to form continuous inclined faces 50, 51 spanning the breadth of the work piece. A second bar 52 is provided on support member 54 to abut the second main surface of the work piece. Scraper bars 18 and 52 are resiliently sprung so as to be generally biased in the directions indicated by arrows 42 and 44 respectively. Corresponding arrangements supported by surfaces 56 and 58 and positioned symmetrically opposite, make up a total of four equivalent scraper bars.

A first cutting tool 60 is mounted in a chuck 64 supported on work spindle 14. The spindle assembly 64, 14 is movable in the y and z directions. The second work spindle 16 with a second chuck 66 and cutting tool 62 may also be translated in the y and z directions. The motion of spindles 14 and 16, relative to the work piece, is driven by a y-axis motor and a secondary z axis motor, which are controlled either separately or in unison.

In use, the work piece is either manually or automatically loaded into the gap between conveyors 37 and 38 of the first belt grip assembly 10. The work peice is gripped by a pinching action due to the biasing forces applied to the conveyors 37, 39. By simultaneously driving conveyor rollers 24 and 34 in opposite senses, x-axis movement is achieved with respect to the cutting tools 60, 62. The work piece can be fed from the first belt grip assembly 10 to the second 12 which is driven correspondingly. If the work piece is conveyed so that it becomes entirely free of one belt grip assembly, it will be firmly held by the other. The work spindles 14 and 16 can then be moved to effect y and z-axis motion with respect to the work piece. In this way, machining can be preformed simultaneously at any selected one or two of the faces of the work piece.

The frictional forces between elastomeric belts and the surfaces of the work piece prevent the relative motion of one with respect to the other. This is so even under the sideways and longitudinal forces imposed by cutting along the y and x-axes respectively. When cutting along the x or y-axes the force exerted by the cutter on the work piece will pass to the frame of the machine via the belts, rollers and bearing assembly. In order to maintain perfect register, the frictional forces between the belt surfaces and the work piece surfaces must transfer these forces without relative motion of the surface.

The scraper bars 18,52 have several functions. These include gripping the work piece close to the cutters to provide rigidity along the y axis, supporting the work piece when under the load of the cutter feeding along the z-axis, confining debris to a specific area and cleaning the circulating belts by a continuous scraping action.

In productive operation, larger off-cuts, supported from below by the scraper bars 52 move back and forth within the holes from which they were cut. Any sawdust that does drop out will be carried away by a dust removal system. The distance along the y-axis, between the first 10 and second belt grip assemblies 12, is varied in accordance with the diameter of the cutting tools 60, 62. This ensures that the scraper bars 18, 52 remain at the optimal distance from the cutting tool irrespective of cutter tool size.

Operation is preferably a continuous single stage manufacturing process conducted under computer numeric control (CNC). A cutting machine according to the invention could serve as the manufacturing element of an improved integrated CAD/CAM system. Such arrangements offer cost savings with components requiring many machining operations and/or production in relatively small volumes. This advantage, in particular, has significant impact on design freedom. Such machines can be controlled by an industrialised PC control system. This, in turn may link directly to a network of individual PCs operable, for example, by DOS and Windows based systems.

Preferred cutting machines offer increased work piece rigid without separate jigs or fixtures. Machining different surfaces of the work piece simultaneously offers significant efficiency gains. Components or whole items can be manufactured in a continuous process and without the need to transfer to other machines.

Depending on design tolerances, preferred embodiments can process non-standard work pieces, for example twisted, warped, unusually wide or bulky. This versatility means production runs of small volumes and components with parameter driven designs are more cost effective.

The machine is designed to operate with only a minimum mass in motion, to afford advantages including reduced wear of moving parts, faster slew rates and tighter path control.

Appropriate choice of cutting tool type and size, facilitates a wide variety of functions. These include the use of counter sinks, form cutters, etc., for veneers, sculpting and other 3D work. High cutter diameter to length ratios are enhanced by specialised cutting tools and/or cutting from both sides. The confined cutter envelope facilitates efficient dust or debris removal and effective guarding.

The machine can be applied to previously difficult tasks without damage. Typical examples include rapid through drilling of veneers, laminates, fine window frames and other more elaborate work pieces. In particular, a technique of machining simultaneously on opposing sides with perfect register reduces the risk of damage to delicate subjects.

A particularly advantageous result is achieved when cutting a circular path in natural wood having a grain by means of an upper cutter and a lower cutter rotating in the opposite sense. At each position around the circular path, there will be a preferred cutter rotation sense with which a clean cut is obtained and an unsuitable cutter rotation sense which will damage the wood. By moving the cutters in the z-direction it can be arranged that either the upper or lower cutters is engaged with the wood depending upon which is the preferred sense at the relevant point.

To increase the pinch strength of the belt grip assemblies 10 and 12,. extra rollers can be provided. Alternatively, a fluid cell platen, using compressed air, can be arranged behind the belts to apply a force over a large area. This increases the pinch strength of the belt grip assemblies, but also increases the cost of the machine.

In a modified version of the machine designed to process non-standard shaped work pieces, the scraper bars 18,52 are of a pliable material. Alternatively, a selected one or more of the scraper bars is loaded hydraulically so that it may distort to accommodate variations in shape. In order to reduce belt creep, the edges of the various cylindrical rollers can be provided with guide elements, such as rails or the like. Alternatively, the work piece can be clamped to the belt. However, any such clamping devices would need to disengage as that part of the belt approached the roller.

In other modified versions of the cutting machine, the operation of the scraper bars may be enhanced in a number of ways, for example, the surface 48 of each bar operable to grip the work piece may be provided with:

(a) a hardened serrated edge, either flattened or sharp, to bear onto or cut into the surface of the work piece;

(b) a serrated or fluted surface made of elastomeric or plastics materials which, when experiencing sideways motion, pushes the work away from the surface by virtue of a specific sectional design, thereby increasing the coefficient of friction between the two surfaces;

(c) a vacuum suction area, with or without compressed air on one side of the work piece;

(d) elements such as small disks or rollers along the edges of the bar;

(e) a specialised material with unidirectional tribometric properties;

(f) combinations of two or more of features (a)–(e).

If the increased force required to move the work along the x-axis becomes greater than desired, the effect can be off-set by automatically releasing the biasing means during rapid traversing to minimise power requirements.

In a process generating numerous and sizeable off-cuts, the scraper bars 18,52 may be provided with a positive rake edge with no radius in very close contact with the surface. Off-cuts deviating from the desired path are then sliced off and carried away. In other modified versions of the machine, the scraper bars 18,52 are provided with brushes to clean the belts more effectively. The entire cutting envelope may be enclosed and suck and blow dust removal systems may be incorporated.

In a different embodiment of the present invention, series of independent rollers replace the conveyor belts of belt grip assemblies 10 and 12. Not all of the rollers need to be driven. Such an embodiment is expected to be useful where the work piece has a non-standard shape and may provide advantages of easy debris removal. In general, however, the area of surface contact between the rollers and the work piece is less than with belt grip assemblies and the frictional forces may be inadequate for some applications.

A plurality of cutting tools may be provided in alignment with the tools 60,62 and spaced along the gap between assemblies 10 and 12. The spacing between tools along the gap may be uniform or varying. The tools aligned with tool 60 are preferably ganged therewith, but some or all may be operated independently thereof; the same applies for the tools aligned with tool 62.

References to direction and elevation in this description are arbitrary and are not intended to limit the invention to configurations with the work piece held in the horizontal plane.

What is claimed is:

1. A cutting machine comprising first (10) and second (12) work piece support means, said means including opposed surfaces operable to grip a work piece (20) and move it in a controlled manner in a first direction, and first (14) and second (16) cutting tools disposed substantially between the first and second work piece support means such that they are operable to approach and cut the work piece from opposite sides, each cutting tool (14, 16) being movable in second and third directions, said second and third directions being substantially orthogonal to the first direction and said second and third direction being substantially orthogonal to each other, wherein the machine further comprises at least one elongate scraper bar (18, 52), the scraper bar having a main axis, said main axis being orientated substantially perpendicularly to the first direction and disposed so as to abut surfaces of the work piece adjacent to the area being cut.

2. A cutting machine according to claim 1, wherein said at least one scraper bar comprises first and second pairs of elongate scraper bars (18, 52), the first pair being disposed so as to abut opposite sides of the work piece between the area being cut and the first work piece support means (10), the second pair being disposed so as to abut opposite sides of the work piece between the area being cut and the second work piece support means (12).

3. A cutting machine according to claim 2, wherein the respective bars (18, 22) of the first and second pairs are resiliently-biased towards each other.

4. A cutting machine according to claim 1, wherein the spacing between the opposed gripping surfaces is adjustable such that the work piece support means (10, 12) can accommodate different sized work pieces.

5. A cutting machine according to claim 1, wherein the opposed gripping surfaces are resiliently baised towards each other.

6. A cutting machine according to claim 1, wherein the opposed surfaces of each work piece support means comprise first (30) and second (40) belts provided on opposed conveyor assemblies (22, 24, 26; 32, 34, 36).

7. A cutting machine according to claim 6, wherein the internal surface of each belt is connected to a slideway driven by a ball and screw servo.

8. A cutting machine comprising gripping work piece support means (10, 12) operable to reversibly feed a Work piece (20) in a feed direction, and a plurality of elongate scraper bars (18, 52), said scraper bars each having a main axis oriented substantially perpendicularly to the feed direction, and said scraper bars being disposed so as to abut surfaces of the work piece adjacent to the area being machined.

9. A cutting machine according to claim 8, including first and second pairs of elongate bars (18, 52), the first pair being disposed so as to abut opposite sides of the work piece between the area being cut and first work piece support means (10), the second pair being disposed so as to abut opposite sides of the work piece between the area being cut and second work piece support means (12).

10. A cutting machine according to claim 9, wherein the respective bars (18, 52) of the first and second pairs are resiliently-biased towards each other.

* * * * *